United States Patent [19]

Rheinish et al.

[11] Patent Number: 5,322,649

[45] Date of Patent: Jun. 21, 1994

[54] METHOD OF MANUFACTURING SURGICAL IMPLANTS

[75] Inventors: Robert S. Rheinish, Huntington Beach; Allan R. Tonks, Fontana; Thomas P. Richards, Los Angeles, all of Calif.

[73] Assignee: Kabi Pharmacia Ophthalmics, Inc., Monrovia, Calif.

[21] Appl. No.: 924,097

[22] Filed: Aug. 3, 1992

[51] Int. Cl.⁵ .................... B29D 11/00; B26F 1/38
[52] U.S. Cl. ........................ 264/2.7; 83/50; 83/55; 264/1.7; 264/153
[58] Field of Search ........... 264/1.7, 1.1, 2.7, 153; 83/50, 55

[56] References Cited

U.S. PATENT DOCUMENTS

| | | | |
|---|---|---|---|
| 4,080,709 | 3/1978 | Poler | 264/1.7 |
| 4,386,123 | 5/1983 | Coburn, Jr. | 264/1.7 |
| 4,615,701 | 10/1986 | Woods | 623/6 |
| 4,617,023 | 10/1986 | Peyman | 623/6 |
| 4,737,322 | 4/1988 | Bruns et al. | 264/1.7 |
| 4,790,846 | 12/1988 | Christ et al. | 623/6 |
| 4,880,426 | 11/1989 | Ting et al. | 623/6 |
| 4,888,013 | 12/1989 | Ting et al. | 623/6 |
| 4,894,062 | 1/1990 | Knight et al. | 623/6 |
| 4,938,767 | 7/1990 | Ting et al. | 623/6 |
| 4,964,206 | 10/1990 | Knoll et al. | 29/424 |
| 4,978,354 | 12/1990 | Van Gent | 623/6 |
| 5,141,507 | 8/1992 | Parekh | 264/1.7 |
| 5,141,677 | 8/1992 | Fogarty | 264/1.4 |

Primary Examiner—James Lowe
Attorney, Agent, or Firm—Poms, Smith, Lande & Rose

[57] ABSTRACT

The present invention relates to a process for fabricating biocompatible implants. In particular, the present invention process involves punching out implants from sheet stock. In the exemplary embodiment, the implant is an intraocular lens, wherein the lens haptic is punched from ribbon stock fed through a punch press. The punching operation can be accomplished in a planar punch and die arrangement, or the die can be situated on cooperatively rotating drums. In an alternative embodiment, the entire intraocular lens is punched from sheet stock. In this process, the lens optics are formed first in the sheet stock to provide individual convex or concave hemispheres, spaced along the length and width of the sheet. The sheet stock is aligned with a die, and the die punches out the lens such that the lens optic coincides with the hemispheres and the lens haptics are punched therealong simultaneously.

10 Claims, 4 Drawing Sheets

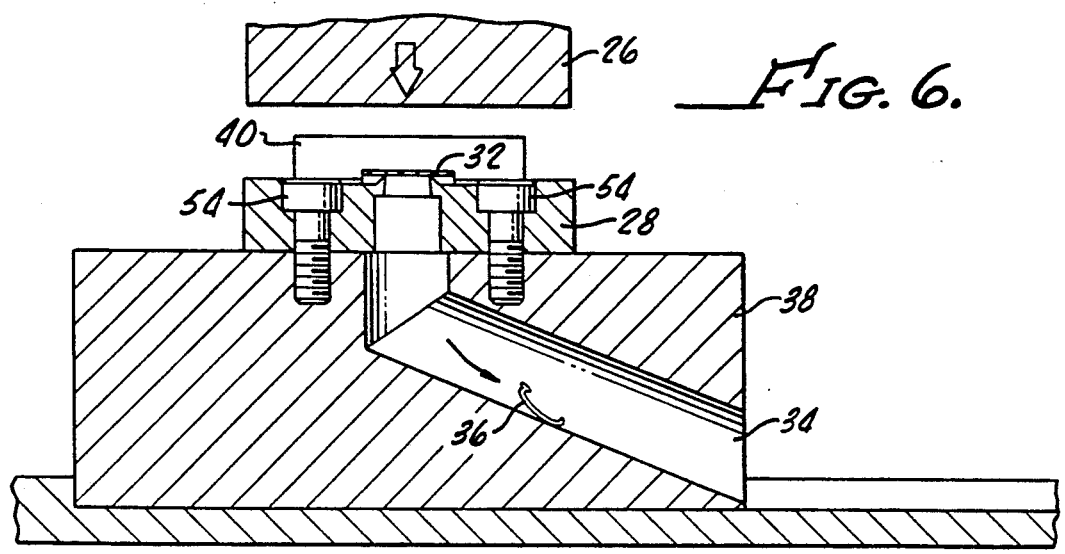
_FIG. 6._
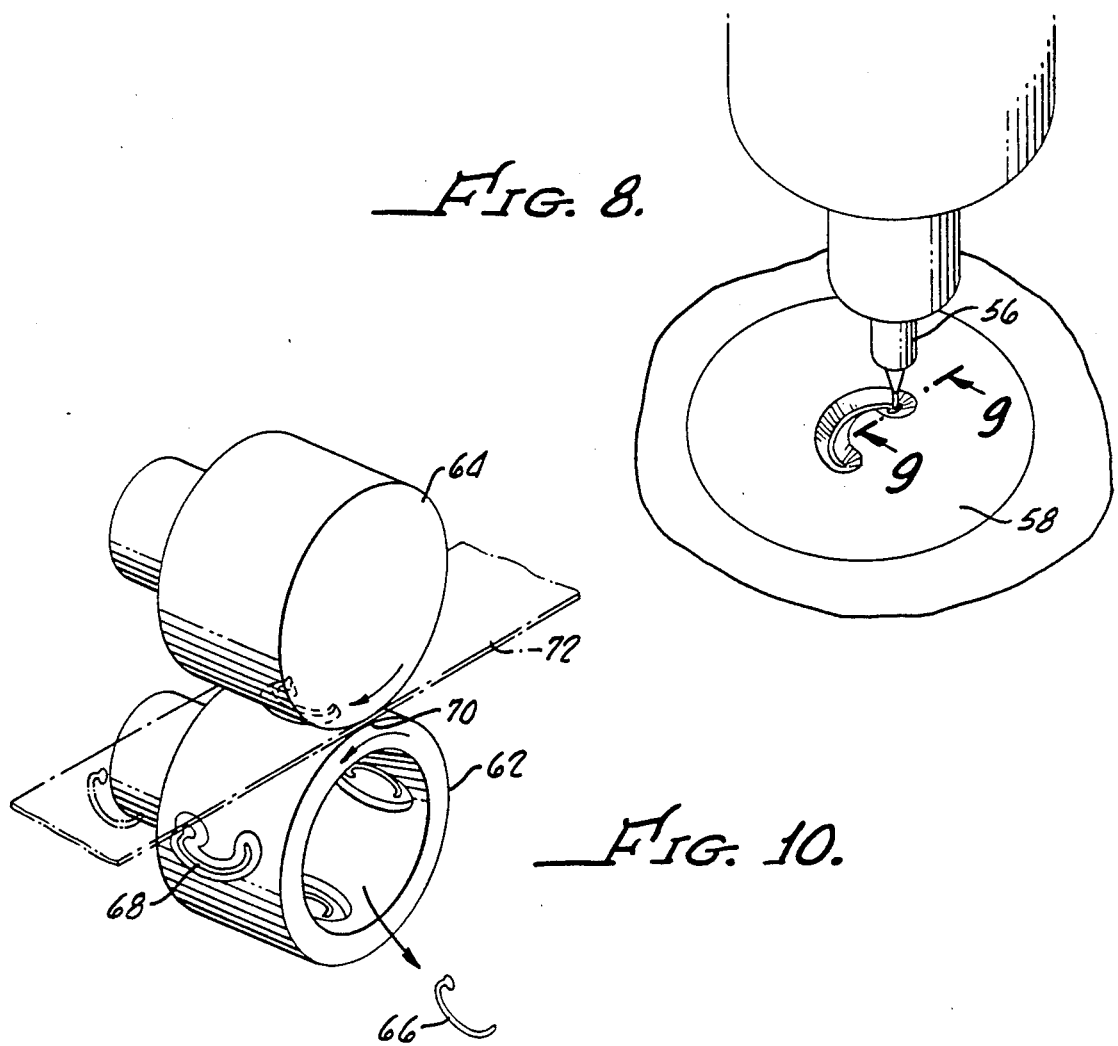
_FIG. 8._
_FIG. 10._

METHOD OF MANUFACTURING SURGICAL IMPLANTS

FIELD OF THE INVENTION

The present invention relates to a process for fabricating surgical implants. More specifically, the present invention relates to a process for fabricating surgical implants by punching the implant from sheet material.

BACKGROUND OF THE INVENTION

Among the well-known advances in medical practice is a variety of small scale structural devices designed for surgical implantation in a patient or laboratory subject. Examples of such devices include prosthetic implants (e.g., corneal inlays or inserts, intraocular lenses, heart valves, and the like) and reparative implants (e.g., staples or rivets for attachment of delicate tissue or for closing of incisions). In general, these implants have in common with each other qualities such as biocompatibility, including chemical inertness, sterility or sterilizability; and biostability, including resistance to corrosion and degradation. Additionally, for efficient insertion and long life, any such device preferably exhibits the attributes of strength, flexibility and small size.

The present invention relates to a process for fabricating such surgical implants, and resolves many problems encountered by prior art processes. Although the present invention process is applicable to a broad genus of biocompatible, surgical implants, discussion here is limited to a species of the genus for the sake of clarity. That is, the archetype species disclosed in the following is an intraocular lens fabricated in accordance with the present invention. Naturally, one skilled in the art with knowledge of the instant disclosure can easily adapt the present invention process to numerous other implant structures known in the art.

By way of introduction, an intraocular lens has a principal refractive structure known as a lens optic, and one or more support structures for positioning and centering the lens optic within the anterior or posterior chamber of an eye. Commonly referred to as "haptics", these support structures may be integrally formed with the lens optic (a one-piece lens), or separately manufactured and attached to the lens optic (a multi-piece lens).

An important goal for intraocular lens design is to minimize trauma to the eye when the lens is inserted. To that end, effort is made to ensure, for example, that the incision to the eye is kept small during the implantation operation; that biologically inert materials are used in the construction of the intraocular lens; and that the physical proportions of the lens do not interfere, irritate, or damage delicate inner eye tissue.

What makes achieving those design goals difficult is that often the characteristics necessary for a good lens optic are undesirable for the lens haptic, and vice versa. This dichotomy presents a major challenge for designers of one-piece lenses, in which the haptics are formed integrally with the optic.

Conventional intraocular lens optics, for instance, are commonly made from biocompatible materials such as polymethylmethacrylate (PMMA). With this rather rigid material, lens optics are easily cast or machined into their final form. So in regard to handling ease and manufacturability, the benefits of PMMA are obvious. By the same token, because this material is rigid, many of the foregoing design goals are compromised.

Recently, however, more flexible materials have been devised for the lens optic. Flexible lens optics cast of elastomeric materials such as silicone or hydrogels, for example, have gained popularity because they produce foldable intraocular lenses that may be inserted through a beneficially small incision in the eye.

Once the intraocular lens is implanted, the haptics must hold the lens optic in proper alignment with the optical axis of the eye as well as support the weight of the lens optic. The haptics must therefore be sufficiently rigid to perform their function. In short, haptics must simultaneously be pliant enough to avoid damaging delicate eye tissue yet rigid enough to act as a stable support structure.

The majority of the so called "small incision" lens designs have been limited to multi-piece designs. A small incision lens connotes a flexible lens that is folded during implantation. Experience has shown that a flexible lens optic material that is desirable for the optic is usually too flimsy to work for the haptic in its support function—hence, the evolution toward the multi-piece lens design.

The type of material is also an important factor. Elastomers commonly used for the optic do not perform satisfactorily as an haptic, except, perhaps, in a broad flange configuration, which is less desirable than other more streamlined configurations. As a result, a flexible intraocular lens optic is commonly paired with more rigid polypropylene monofilament haptics.

A wide variety of haptic configurations intended for use with silicone or other elastomeric lens optics have been produced by permanent deformation of an elongated filament, as disclosed in U.S. Pat. No. 4,880,426 to Ting et al.; or by staking in the lens optic an anchor formed at an end of the filament haptic, as taught in U.S. Pat. No. 4,894,062 to Knight et al. Unfortunately, the Ting and Knight intraocular lenses exhibit only moderately satisfactory pull strengths and resistance to axial torque. As is known in the art, pull strength is a measure of the haptic's ability to resist detachment from the lens optic when subjected to an outward, radial tensile force. Torque is a twisting force applied to the haptic. Such forces, among others, are commonplace during implantation surgery where the lens may be grasped and manipulated by the haptic.

In order to obtain acceptable pull strengths, some filament haptics are provided with an enlarged anchoring head that helps secure it to a flexible lens optic. But an enlarged anchoring head is usually difficult to form consistently because conventional manufacturing techniques involve, for example, winding an end of the monofilament material around a small diameter mandrel and ultrasonically welding the overlapping part of the filament to fix the looped shape. This technique is generally disclosed in U.S. Pat. No. 4,790,846 to Christ et al. The welding is necessary because without it, the loop cannot hold its form. If the form is lost, the shape collapses or unwinds and it is easy for the haptic to detach from the lens optic. Even if the loop were welded closed, the filament might still be too flexible to retain the loop shape under tension, and again the loop would collapse.

Although the prior art looped-shape anchoring head helps interlock the haptic to the lens optic, and the design has met with some commercial success, it does have drawbacks. First, the process steps undergone in creating the looped anchoring head are extremely labor intensive, and require highly-trained technicians to skillfully manipulate intricate tools while observing through a magnifying lens. As such, it is difficult to maintain consistently high quality in the finished product. Second, because so much labor is involved, high production speeds cannot be attained. Consequently, conventional intraocular lenses of this type are not easily adapted to automated mass production, and production costs are significant.

Third, by wrapping an end of the filament around a mandrel and welding it to create the closed loop, a double thickness of haptic material at the point of overlap is made. This double thickness may be greater than the thickness of the optic itself, causing the haptic to protrude from the lens surface. In the alternative, the looped anchoring head may be positioned closer to the thicker central optical zone of the lens and away from the thinner lens periphery. Unfortunately, the presence of the anchoring head in the optical zone may distort or detract from the image seen through the lens optic.

Fourth, another disadvantage inherent in the welded-loop anchoring head haptic is the potential for the weld to break as the filament is subjected to longitudinal stress. This has been known to result in the haptic pulling away from its anchoring point and out of the optic altogether.

Fifth, insofar as the weld itself is concerned, it may be prone to chemical degredation or leaching, which may contaminate the ambient environment after implantation. Such an occurrence could be catastrophic in the eye because it may lead to vision problems.

There have been attempts at configuring other shapes for the enlarged anchoring head, aside from the welded-loop discussed above. For instance, Ting, Knight, as well as U.S. Pat. No. 4,888,013 to Ting et al. and U.S. Pat. No. 4,978,354 to Van Gent collectively disclose enlarged anchoring heads having a triangular shape, a sawtooth shape, an arrow-head shape, a knob shape, a barbed hook shape, and a hammer-head shape. The resulting haptics, however, have proven inadequate for a variety of reasons, for instance: (1) reliance on bonds that may fail or chemically leach into the environment; (2) non-adherence of optic/haptic materials; (3) an axially symmetrical anchoring head design that cannot resist torque along that rotational axis; or (4) the anchoring head shapes are too bulky.

A key to superior pull strength is the amount of surface area that the anchoring head engages in a specific direction within the lens optic. Indeed, it determines the pull strength and the ability of the haptic-optic joint to withstand torsional and bending forces.

As mentioned above, most prior art haptics rely on monofilament strands, which is a design that is saddled with many disadvantages. Departing from the filament approach, there have been attempts at acid etching the haptic from sheet material. Specifically, this process entails etching a silhouette or blank of the intended haptic design out of a sheet of biocompatible material. Unfortunately, the process cannot accurately etch out patterns having crisp 90 degree bends or sharp angles. As a result, the anchoring heads so formed have rounded edges and broadly curved structural features which easily pull from the cast soft lens optic material. Additionally, the materials used for etched haptics must be susceptible to the etching process and therefore cannot be chemically inert. The etching process limits therefore restrict a lens designer's ability to resolve structural problems by trying creative and unconventional haptic shapes or new materials.

Aside from the etching process, others have attempted to mill out an optical article from sheet stock. In particular, U.S. Pat. No. 2,302,918 to C. V. Smith discloses a method for producing optical articles. The method involves milling a blank of resinous material of predetermined circumferential dimension from sheet stock using a circular cutting device. There is, however, no disclosure or discussion about producing a structure as complex as an intraocular lens haptic, or a structure so small.

SUMMARY OF THE INVENTION

Accordingly, it is an object of the present invention to provide a method of fabricating an implant, wherein the implant is punched from a ribbon or sheet of material. It is another object of the present invention to provide a method of fabricating an implant such that the process can be automated for mass production with very high quality rates. It is yet another object of the present invention to provide a method of fabricating an implant using exotic and/or chemically inert materials having superior mechanical and biocompatible properties. It is still yet another object of the present invention to provide a method of punching an implant having complex geometric shapes with relatively sharp angles and edges on a small scale.

The present invention provides a method of fabricating implants that are punched from chemically inert and biocompatible sheet or ribbon materials. Although the present invention genus is directed to implants, for the sake of illustration and clarity, the discussion is directed to an exemplary species of that genus. In this case, the species is an intraocular lens or parts thereof.

The preferred embodiment process provides an intraocular lens haptic having an enlarged anchoring head that is punched from sheet stock. The present invention process may also include forming an oblong hole located in the anchoring head. Following fabrication, a lens optic is cast around the enlarged anchoring head and lens optic material flows therearound and through the oblong hole. Once the casting solidifies, the anchoring head is firmly embedded in the lens optic. With the anchoring head so disposed, there is a significant amount of lens optic material that the anchoring head engages. Moreover, the anchoring head is provided with flat faces and sharp edges and angles which resist pulling smoothly through the lens optic material. This ensures a high pull strength for the joint.

In the preferred embodiment, the enlarged anchoring head of the haptic has a polygonal, preferably rectangular shape. A tail-like support portion of the haptic, formed integrally and simultaneously with the anchoring head, extends at a substantially right angle therefrom. At the point of intersection between the two structures is a "T" formation having outstretched shoulders. Advantageously, the outspread shoulders help prevent detachment of the anchoring head from the lens optic when a tensile force is applied to the haptic support portion because of the relatively large expanse of lens optic material obstructing its motion and the sharp angles and intersections of the structure which prevent the anchoring head from smoothly sliding through the lens optic material.

The present invention process thus has the capability of fashioning the aforementioned T-shaped intersection with outspread shoulders from sheet stock. To be sure, the shape is fairly complex, as is the entire haptic geometry. In many prior art processes, on the other hand, such a sharp bend or complex geometry cannot be precisely formed.

In the preferred embodiment process, the haptic, which includes the anchoring head and the support portion, is fabricated in one piece from sheet or ribbon material. In an exemplary embodiment, the haptic is punched out of the sheet of material in a single step. Alternatively, the oblong hole may be punched through the anchoring head in a second step. Similarly, the haptic may be cut from sheet or ribbon material in a two-stage die cutting process wherein one side or edge is cut before the other. In either alternative methodology, because the haptic is derived from sheet form, the haptic is free from the twisting that may appear with circular cross-sectional support portions in the prior art haptic. Furthermore, no bonds or welds are needed so chemical degradation and leaching are not a problem.

In addition, because the present invention haptic is punched from sheet material, the support portion of the haptic is easily configured into a variety of different shapes that can be customized to ensure stability and centration of the optic. Many of these shapes are not obtainable with conventional processes because of fabrication problems, thickness problems, spring-back in the material, welding or bonding problems, and the like.

Moreover, the present invention haptic is adaptable to mass production. As stated above, the haptic material begins in sheet form, preferably a ribbon. The sheet or ribbon is fed to the press area, where it is aligned over a die and a ram is lowered thereon. A blank of the haptic silhouette is thus cut out of the ribbon by the die. The stroke of the ram is repeated over and over. Large quantities of the haptic can thus be manufactured with repeatable precision and high quality.

Another advantage of the present invention process is that, with a sheet haptic so formed, a designer can choose a preferred orientation for the haptic's microscopic grain structure. More specifically, in many cases the grain pattern of the sheet stock is homogeneous and aligned in one direction. So by aligning the sheet in an particular direction during the punching operation, it is possible to orient the grains to run a certain way along the haptic blank. As is known in the art, grain orientation has an influence on material strength. In the preferred embodiment, the grain structure is lined up along the long dimension of the haptic.

Similarly, the present invention may utilize a wide variety of previously impractical materials. These include chemically inert compounds, multicomponent laminated sheet materials and fiber reinforced materials, among others, which are not suitable for acid etching manufacturing techniques. Accordingly, benefits in haptic biocompatibility and mechanical properties are available with the present invention.

It should be emphasized that the present invention process is easily adaptable to automation. The reason is that since a punching operation requires very little skilled labor input, as is known in the art, the process can be performed easily by an automaton. Additionally, because highly trained hand labor is not involved, manufacturing costs are reduced, quality control is increased, and variations from one part to the next are minimized.

BRIEF DESCRIPTION OF THE DRAWINGS

FIG. 6 provides a cross-sectional view of the tooling taken along line 6—6 of FIG. 3.

FIG. 8 illustrates the process of punching an oblong hole in the haptic.

FIG. 10 illustrates an alternative embodiment process wherein the punching operation is performed by twin rollers.

DETAILED DESCRIPTION OF THE INVENTION

The following specification describes a process for manufacturing implants. In the description, specific materials and configurations are set forth in order to provide a more complete understanding of the present invention. But it is to be understood by those skilled in the art that the present invention can be practiced without utilizing these specific details and that other equivalent materials, steps and configurations are within the scope of the present invention. In some instances, well-known elements are not described precisely so as not to obscure the invention.

Generally, the present invention is directed to a process for fabricating an implant comprising the steps of providing a sheet of material, providing a cutting die defining the shape of the implant, aligning the sheet with the die, and punching the die through the sheet to produce a blank of the implant. This can be a single or multiple stage process. Although the present invention is directed to a method for producing implants, for the sake of illustration and clarity, the following discussion focuses on an intraocular lens and parts thereof as an exemplary embodiment.

Figure 1:
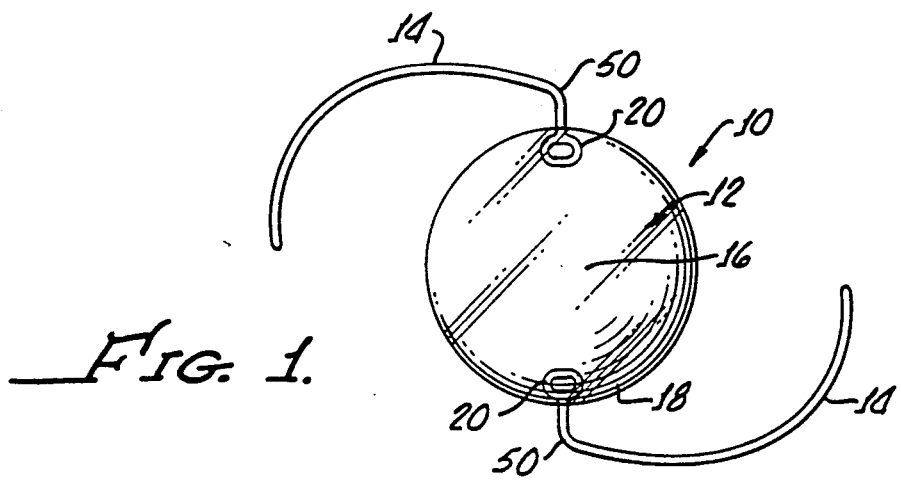
FIG. 1 is a plan view of an exemplary embodiment implant produced in accordance with the present invention process.

FIG. 1 provides a plan view of an exemplary embodiment intraocular lens 10 fabricated in accordance with the present invention process. The intraocular lens 10 is basically comprised of two identical haptics 14 extending from a circular or hemisphere-shaped lens optic 12. One end of each haptic 14 has an enlarged anchoring head 20 that is embedded into an outer periphery 18 of the lens optic 12. As is known in the art, the haptics 14 become embedded in the optic 12 when the latter is cast and solidifies thereafter. Alternatively, the haptics maybe inserted and locked into a preexisting lens optic. At this preferred peripheral location, the enlarged anchoring head 20 does not interfere with vision through the optical zone 16 of the lens optic 12. When formed in accordance with the present invention process, the haptic 14 can be fashioned to have one or more bends 50 that follow any number of curves or angles.

Figure 2:
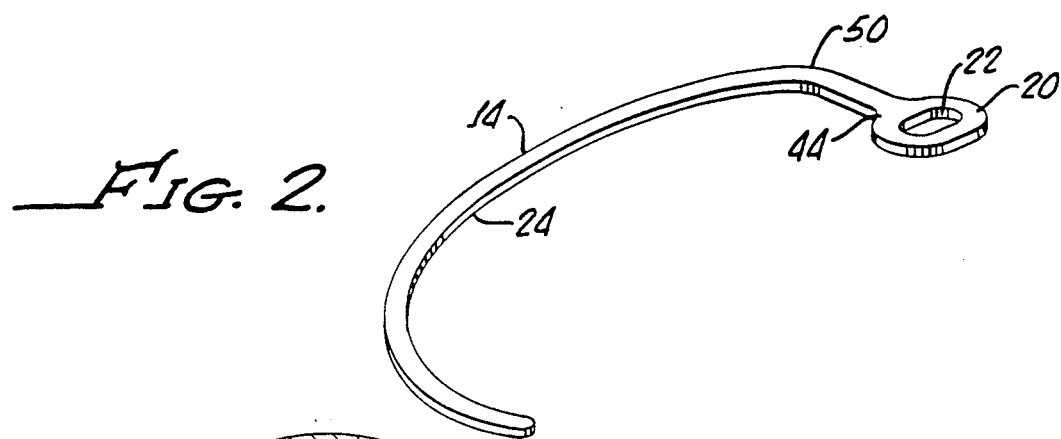
FIG. 2 is a perspective view of a lens haptic produced in accordance with the present invention process.

FIG. 2 provides a perspective view of an exemplary single lens haptic 14 formed in accordance with the present invention process. Upon closer scrutiny, one sees that the haptic 14 contains a sharp bend 50 and a T-shaped intersection 44 where the support portion 24 joins the enlarged anchoring head 20. Importantly, a haptic constructed according to the present invention process features a support portion that is integral with the anchoring head. This is unlike conventional haptics where it is common to bond or weld the anchoring head to the support portion. As mentioned above, bonding or welding often leads to thickness problems as well as complications during or after surgery.

Another feature of the exemplary haptic fashioned according to the present invention process is an oblong hole 22 disposed in the anchoring head 20. The shape of the oblong hole 22, the T-shaped intersection 44, and the sharp bend 50 have geometries that are very difficult to fabricate with conventional processes known in the art. To be sure, conventional acid etching cannot produce the intricate and detailed geometries that are possible with the present invention process.

Figure 3:
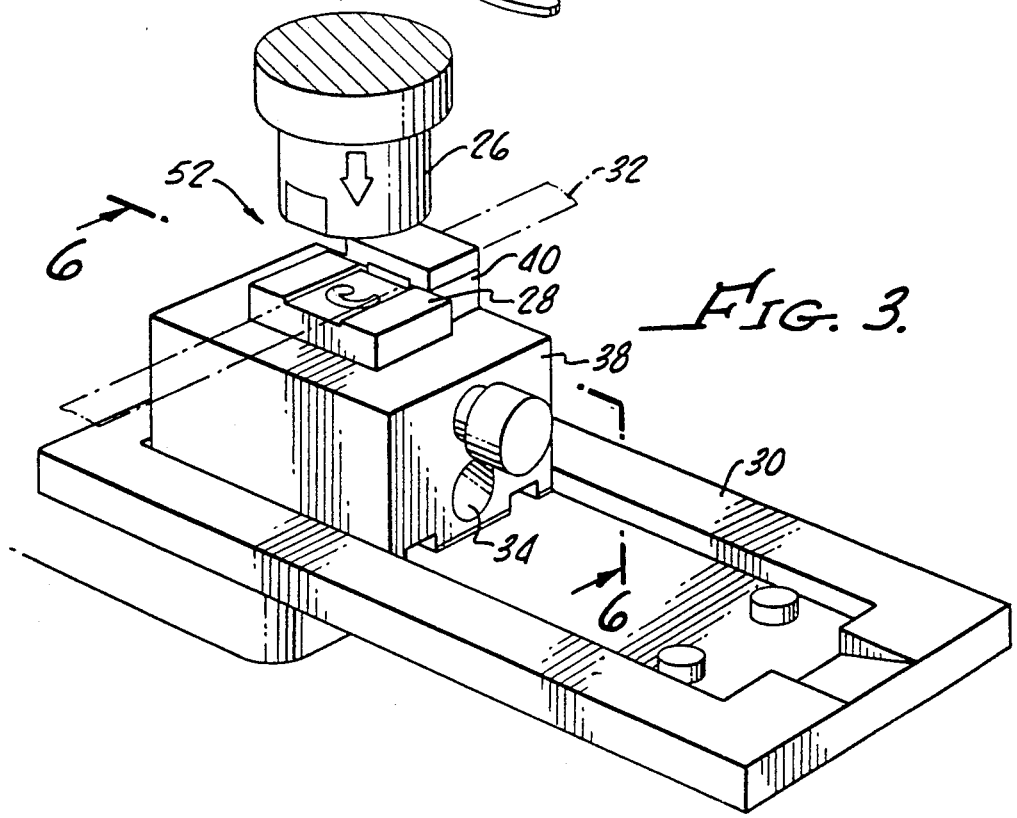
FIG. 3 illustrates an exemplary embodiment of the tooling used in the present invention process.

FIG. 3 provides a perspective view of exemplary tooling utilized in the present invention process. In the exemplary embodiment shown here, the tooling comprises a punch press 52. Because the detailed operations of a punch press 52 are well-known in the art, the following discussion provides only a general overview. As shown in FIG. 3, the punch press 52 comprises a die bed 30 which acts as a platform to support a die shoe 38. On top of the die shoe 38 is the die 28. The position of the die 28 can be adjusted relative to the die shoe 38 to ensure proper workpiece alignment during the punching operation.

Disposed in an overlying position above the die 28 is a strip of ribbon stock 32 that is fed through an indexing clamp 40. Preferably, the ribbon stock 32 is made from a material selected from the group consisting of polyvinylidene fluoride, polyamide, polyimide, polymethylmethacrylate, polytetrafluoroethylene, polypropylene, polycarbonate, and polyurethane, though other biocompatible materials may be utilized. The ribbon can also be a laminated or fiber-reinforced material, or may have a color pigment so the haptic is more readily seen by the eye surgeon. Preferably, the lens haptics formed through the method of the present invention will be punched from polyvinylidene fluoride film commonly known in the industry as KYNAR™ and available from Westlake Plastics Company, Lenni, Pa.

Directly above the ribbon stock 32 is a reciprocating ram 26. An arrow on the ram 26 generally indicates a down stroke, which stroke initiates the punching action. FIG. 6 provides a cross-sectional view of the punch press 52 taken along line 6—6 of FIG. 3. In this view, the ram 26 is moving in its down stroke as indicated by the arrow. The ribbon stock 32 is positioned on the die 28. As the ram 26 comes down, the ribbon 32 is pinched between it and the die 28, and a pattern is cut out of the ribbon 32. The pattern cut out of the ribbon 32 is called a blank 36. The blank 36 drops out from underneath the die 28 and falls through a chute 34 by the force of gravity.

To properly align the die 28 relative to the ram 26, several optional adjustment bolts 54 are used to lock down the die 28 to the die shoe 38. Simply loosening the bolts 54 allows rotational or lateral movement of the die 28 relative to the immobile die shoe 38, as well as like motion relative to the laterally immobile ram 26.

Figure 4:
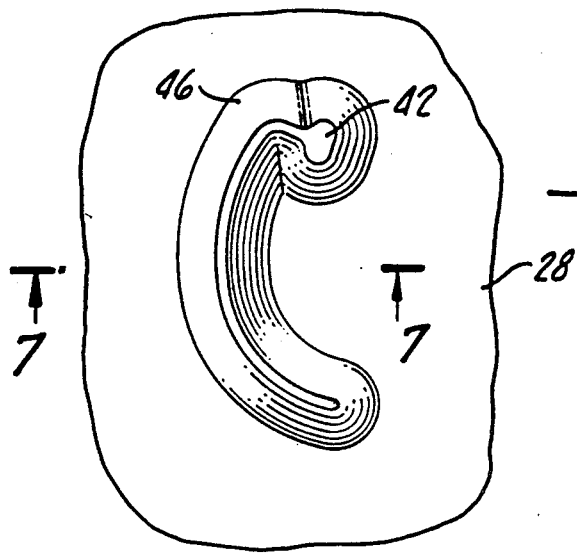
FIG. 4 is a plan view of a die employed in the present invention process.

FIG. 4 provides a plan view of an exemplary embodiment die 28. The die 28 has a die opening 42 reflecting the desired shape to be punched out of the ribbon stock 32. Here the desired shape is a silhouette of the haptic. Naturally, many other complex shapes with intricate geometries are possible aside from that shown in the drawing. Similarly, die 28 can be configured for a two- or multi-step cutting process (not shown) where each face or edge of the haptic is cut sequentially. The die opening 42 has a sharp cutting edge. A relief pattern 46 raises the opening 42 to above the surface of the die 28.

Figure 7:
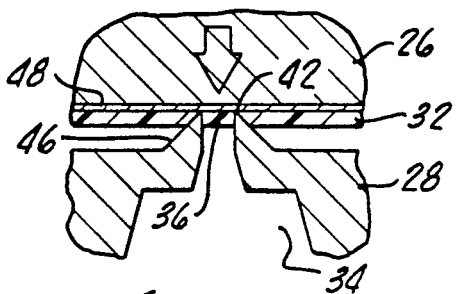
FIG. 7 is a cross-sectional view of the die taken along line 7—7 of FIG. 4.

FIG. 7 provides a cross-sectional view of the die 28 and the relief pattern 68 taken along line 7—7 of FIG. 4. In the instant of time shown in FIG. 7, the ram 36 has displaced in the direction of the arrow to its bottom-most position thereby forcing the ribbon stock 32 into the relief pattern 46, causing the sharp die opening 42 to shear out the blank 36 from the ribbon 32.

Still in FIG. 7, the present invention process provides an optional layer of shock absorbent material 48 disposed between the contact surface of the ram 26 and ribbon stock 32. The principal reasons for the absorbent layer 48 is to prevent the sharp die opening 42 from impacting the rigid surface of the ram 26 and to enable the die 28 to cut cleanly and completely through ribbon stock 32. In this manner, shock absorbent material 48 functions to prevent damage to either ram 26 or die 28 and produces a sharply cut haptic edge. The shock absorbent layer 48 is preferably made from a cellulose material such as paper though other suitable materials may be utilized as known in the art.

Figure 5:
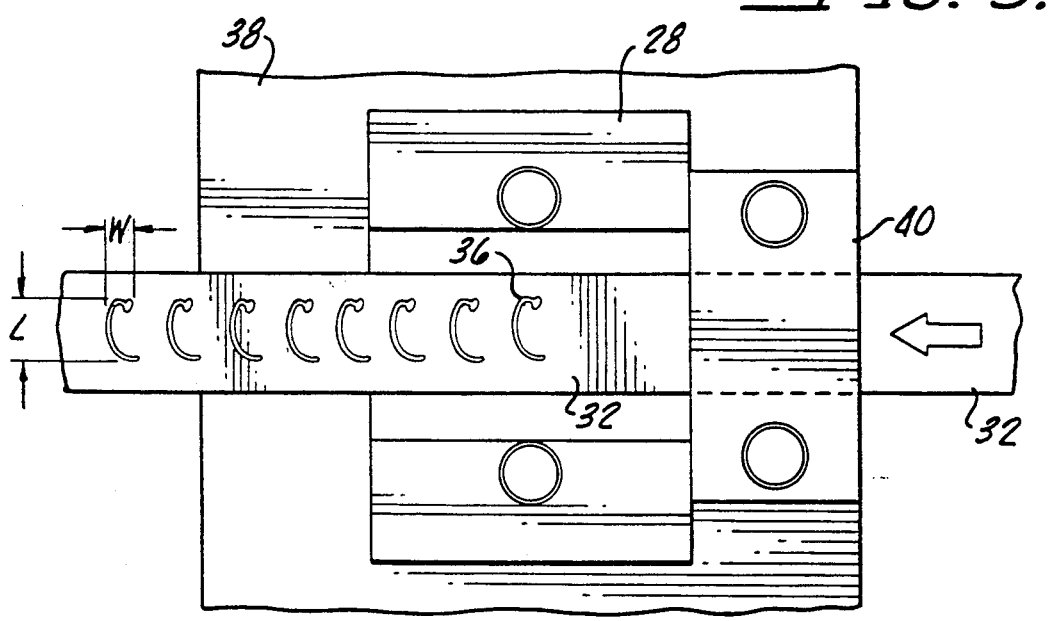
FIG. 5 illustrates sequential punching of lens haptics from a ribbon of material fed into the press area.

FIG. 5 provides a plan view of the process of the present invention, and further illustrates how the grain orientation in the haptic blank 36 can be aligned relative to the intended haptic structure. As shown in this view, the ribbon 32 is fed in the direction of the arrow through an indexing clamp 40, which holds the ribbon 32 in place during the punching operation. Directly beneath the ribbon stock 32 is the die 28. By loosening the adjustment bolts 54, it is possible to rotate the die 28 relative to the ram 26, to the die shoe 38, and to the ribbon stock 32. By changing the orientation of the die 28 it is possible to align the orientation of the blanks 36 when they are punched out of the ribbon stock 32 and thereby align the grain structure in the blank 36.

Thus, as is known in the art, it is possible to obtain sheet stock or ribbon stock 32 with its microscopic grain structure aligned homogeneously in a particular direction. In FIG. 5, for example, the preferred embodiment process employs ribbon stock 32 having a grain structure (not shown) that is aligned in a direction perpendicular to the arrow. Accordingly, each blank 36 punched from the ribbon stock 32 has a grain structure aligned along its long dimension L. Alternatively, if die 28 is rotated, for example, 90 degrees relative to the feed direction of the ribbon stock 32 indicated by the arrow, then blanks 36 would have a grain alignment along dimension W, if desired.

The die 28 can be rotated in an infinite number of angles or angular increments to align the grain structure of the blank as necessary to achieve appropriate design goals. In the preferred embodiment, the grain structure is aligned in the haptic blank 36 along its long dimension L. Needless to say, to achieve a similar change in grain orientation, one could keep the die fixed while rotating the feed direction of the ribbon.

Figure 9:
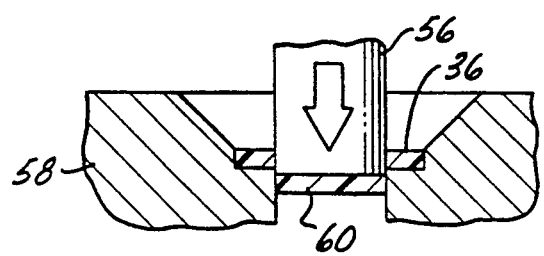
FIG. 9 is a cross-sectional view of the punch and die taken along line 9—9 of FIG. 8.

FIG. 8 illustrates an exemplary embodiment process by which the oblong hole 22 of the haptic 14 is formed. This process step can be performed before, after, or simultaneously with the punching operation of the entire haptic blank 36, shown in FIGS. 3-7. In FIG. 8, the oblong hole 22 is shown being punched after the primary punching operation. A punch 56 is lowered onto a die 58, which cradles the haptic blank 36. The actual punching step is shown in FIG. 9, which is a sectional view taken along line 9—9 of FIG. 8. The punch 56 simply pierces the blank 36 to create the oblong hole 22. Of course, the oblong hole 22 can also be drilled in a miniature drill press, or otherwise formed by any process known in the art. Similarly, the oblong hole 22 can take on many shapes and sizes aside from the exemplary embodiment shown.

FIG. 10 shows an alternative embodiment of the present invention process. In this embodiment, the dies 62, 64 are configured into drums that pinch the ribbon stock therebetween. As seen in FIG. 10, the cutting die 62 contains relief patterns 68 disposed in its outer circumference. The cooperatively disposed bracing die 64 pinches the ribbon stock 72 against the cutting die 62, and the punching action occurs when one of the relief patterns 68 rotates into tangential contact at location 70, and the bracing die 64 urges the ribbon 72 into the relief patterns 68. Each relief pattern 68 punches out its respective blank 66 from the ribbon 72, which blank is then ejected out the side as shown.

It should again be emphasized that the process of the present invention need not be done in a single step. As noted in the alternative embodiment of the present invention discussed above, multiple-step die cutting operations may be utilized in the practice of the present invention. Thus, in addition to punching holes through previously punched implant structures, it is also contemplated as being within the scope of the present invention to cut each face of the blank 36 individually as the ribbon stock 32 is advanced across die 28.

Figure 11:
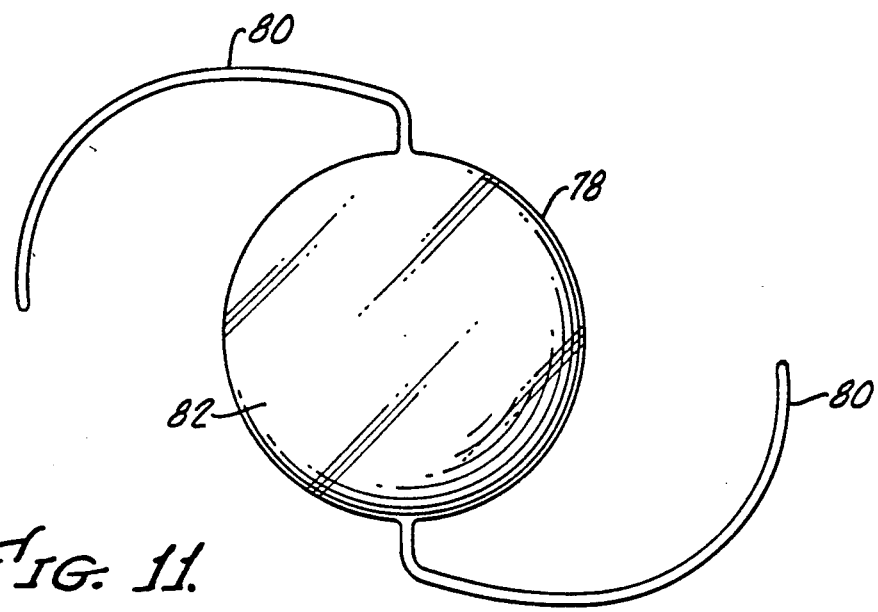
FIG. 11 is a plan view of an alternative embodiment one-piece intraocular lens.

FIG. 11 provides a plan view of a one-piece intraocular lens 78 produced in accordance with yet another alternative embodiment of the present invention process. In this process, the entire intraocular lens 78, including the lens optic 82 as well as the haptics 80, is formed in a single punching operation.

Figure 12:
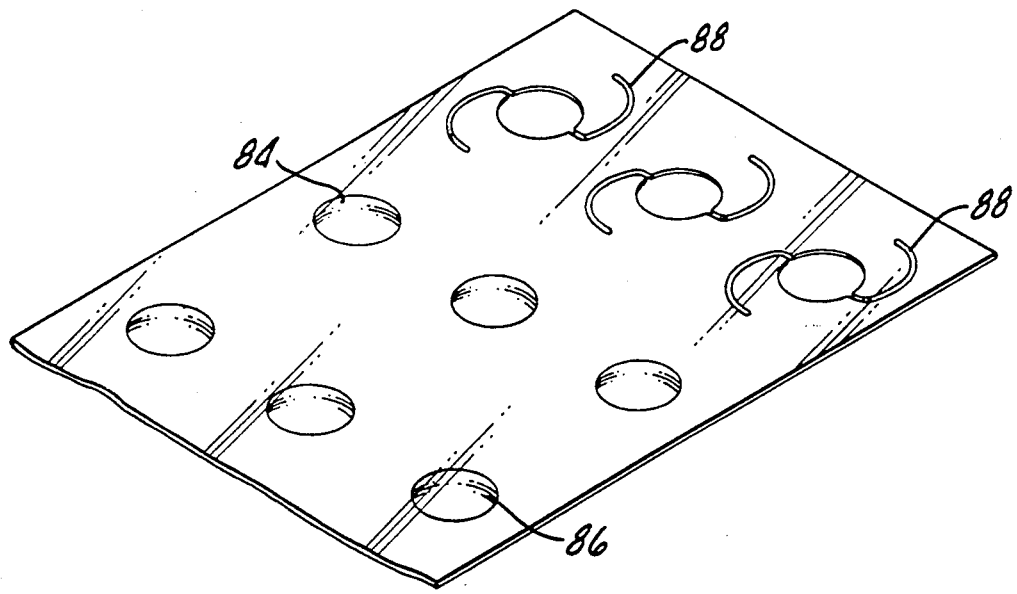
FIG. 12 is a perspective view of sheet stock preformed with hemispheres.

In this alternative embodiment process, the basic punching operation and tooling are similar to that discussed above, except for the preparation of the sheet stock. FIG. 12 shows a sheet 84 of a material having suitable optical qualities to function as a lens optic. For example, the sheet stock 84 is preferably made from any known compound employed as lens optic material, including PMMA, hydrogel, silicone, polycarbonate, or polyurethane. The sheet stock 8 is formed with small lens shaped hemispheres 86 spaced thereon through any process known in the art and configured to have the appropriate optical resolution power for an intraocular lens. It is possible to form these hemispheres when casting the sheet of material or they maybe machined into the surface of the sheet following casting. Each hemisphere 86 corresponds to a respective lens optic 82 in each finished intraocular lens 78. Next, the sheet stock 84 with the hemispheres 86 is fed into a punch press similar to the ones discussed above. A die having the shape of the desired intraocular lens is aligned under each hemisphere 86 and the punching process is performed as described before. Registration holes (not shown) can optionally be formed in the sheet stock if there are any alignment problems between the sheet stock and the punch. Similarly, the sheet stock 84 can be formed as a ribbon provided with the appropriately configured hemispherical projections 86.

After the punching operation, the punched blank is already in the completed intraocular lens form as shown in FIG. 11. As known in the art, polishing may be necessary to complete the finishing of the intraocular lens so produced. What is left on the sheet stock 84 are the blank holes 88. Accordingly, in this alternative embodiment process, the entire intraocular lens 78 is fabricated in a single punching operation. Naturally, the hemispheres can be arranged linearly on a strip or ribbon as in the prior embodiments. Alternatively, as shown in FIG. 12, the hemispheres 86 are arranged on a sheet 84 so that multiple lenses can be simultaneously punched out in one stroke.

Although the present invention process has been described in connection with preferred embodiments thereof, it is evident that numerous alternatives, modifications, variations, and uses will be apparent to those skilled in the art in light of the foregoing description. Therefore, the scope of the present application should not be limited to those aforementioned embodiments.

What is claimed is:

1. A method of fabricating an intraocular lens haptic, said method comprising the steps of:
   providing a sheet of material;
   providing a cutting die defining the shape of said haptic;
   aligning said sheet of material with said cutting die;
   backing said sheet of material with a shock absorbing material; and
   punching said cutting die through said sheet of material to produce said haptic.

2. The method of claim 1 further comprising the additional step of aligning the grain structure of the sheet of material with the die.

3. The method of claim 1 wherein said sheet of material is a ribbon.

4. A method according to claim 3, wherein the ribbon is made from a material selected from the group consisting of polyvinylidene fluoride, polyamide, polyimide, polymethylmethacrylate, polytetrafluoroethylene, polypropylene, polycarbonate, and polyurethane.

5. A method according to claim 3, wherein the ribbon is made from laminated material.

6. A method according to claim 3, wherein the ribbon is made from a material having a color.

7. A method according to claim 3, wherein the sheet of material is made from polyvinylidene fluoride.

8. The method of claim 1 further comprising the additional step of punching a hole through said haptic.

9. A method according to claim 1, wherein the sheet of material is made from polyvinylidene fluoride.

10. A method of fabricating an intraocular lens haptic, said method comprising the steps of:
    providing a ribbon of polymer material;
    providing a cutting die defining the shape of said haptic;
    indexing said ribbon of polymer material into alignment with said cutting die;
    backing said ribbon of polymer material with a shock absorbing material;
    punching said cutting die through said ribbon of polymer material to produce said haptic; and
    punching a hole through said haptic.

* * * * *